Aug. 21, 1951     G. MUFFLY     2,564,854
APPARATUS FOR MEASURING INTENSITY OF MAGNETIC FIELD
Filed June 23, 1947     7 Sheets-Sheet 1

Inventor
GARY MUFFLY
by A. M. Houghton
his Attorney

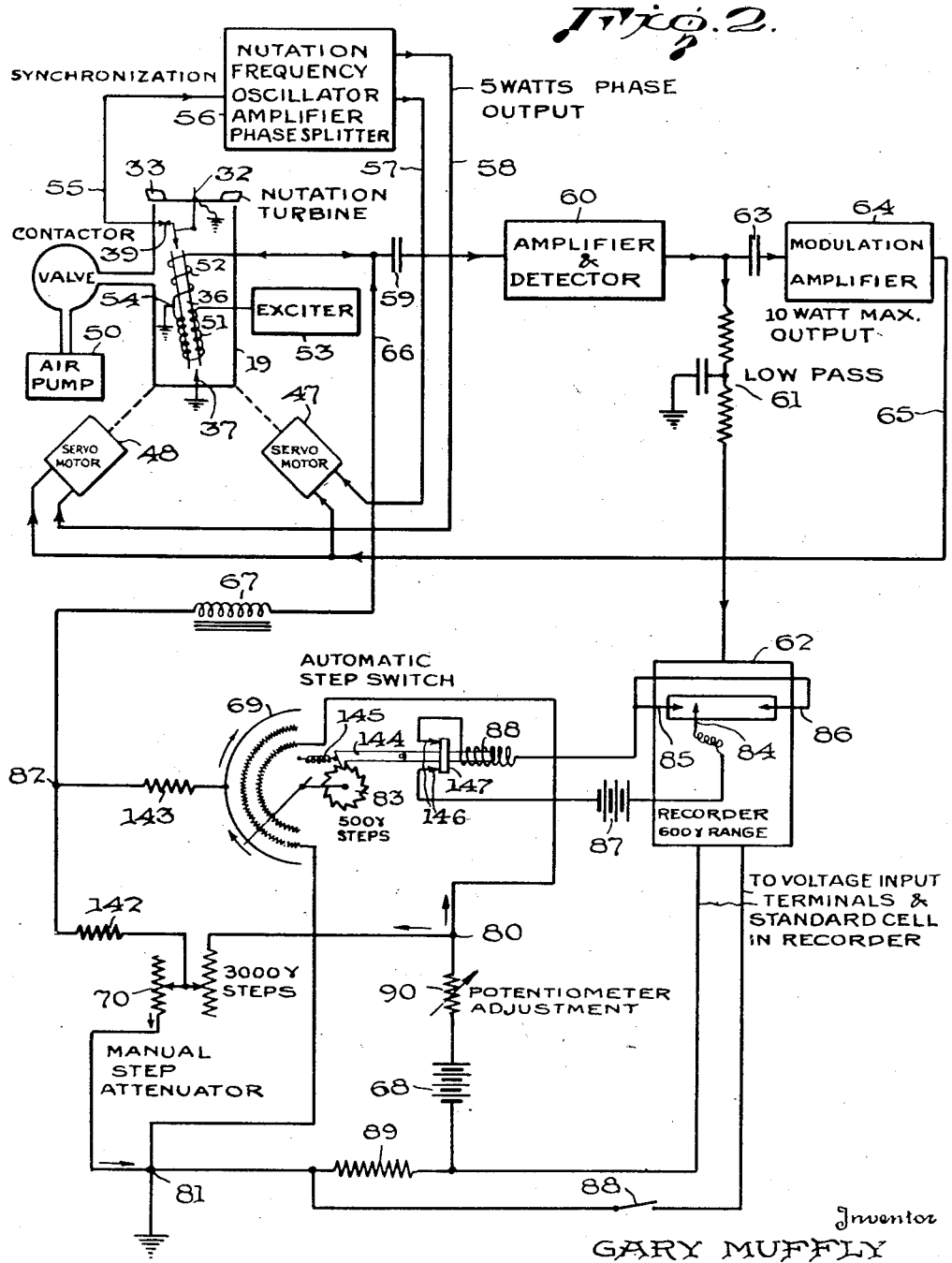

Aug. 21, 1951 G. MUFFLY 2,564,854
APPARATUS FOR MEASURING INTENSITY OF MAGNETIC FIELD
Filed June 23, 1947 7 Sheets-Sheet 3
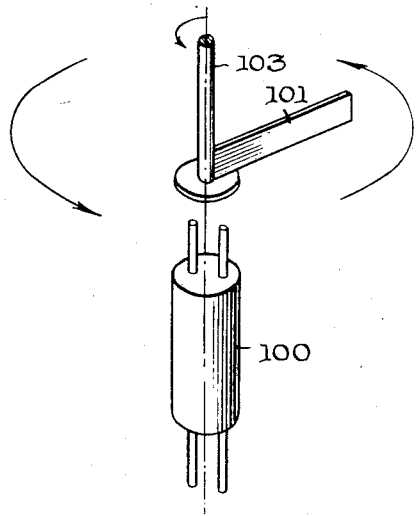
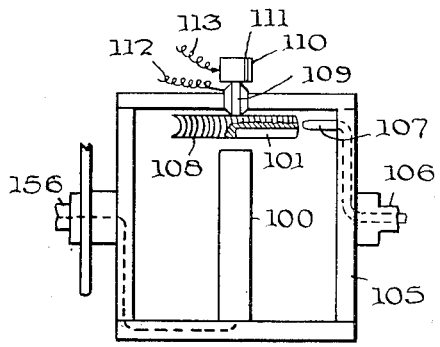
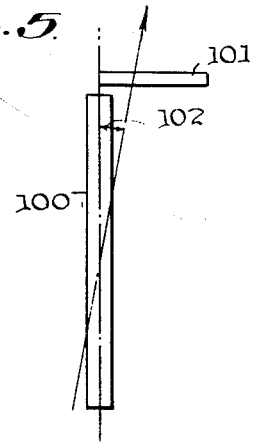
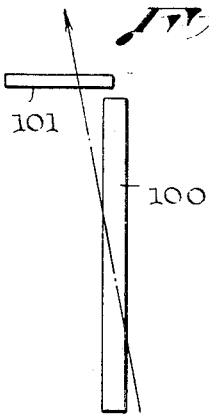
Inventor
GARY MUFFLY
By A. M. Houghton
his Attorney Aug. 21, 1951  G. MUFFLY  2,564,854
APPARATUS FOR MEASURING INTENSITY OF MAGNETIC FIELD
Filed June 23, 1947  7 Sheets-Sheet 4

GARY MUFFLY
By A. M. Houghton
his Attorney

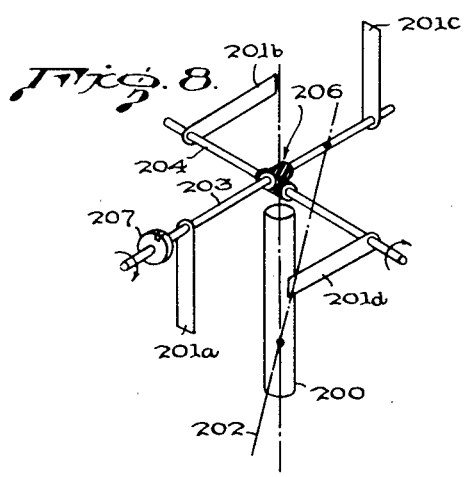
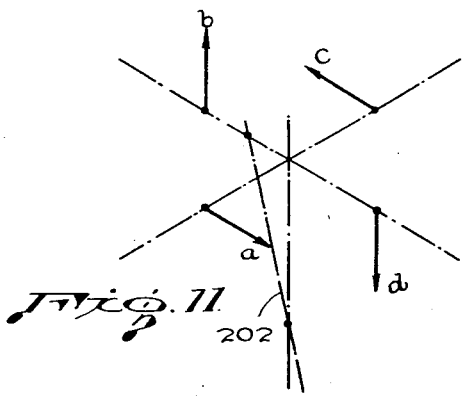
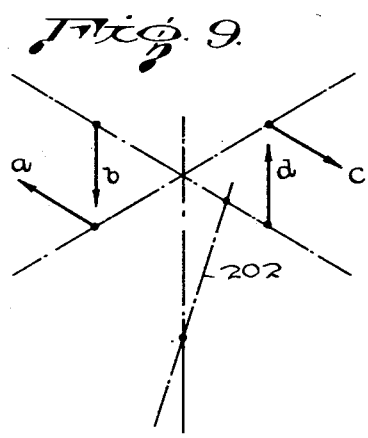
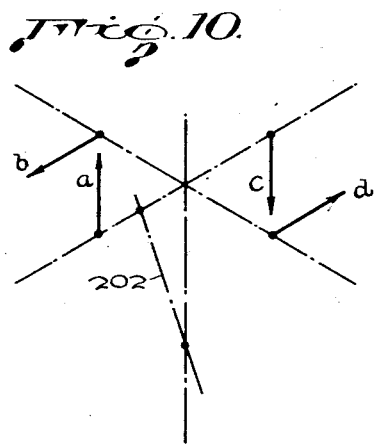
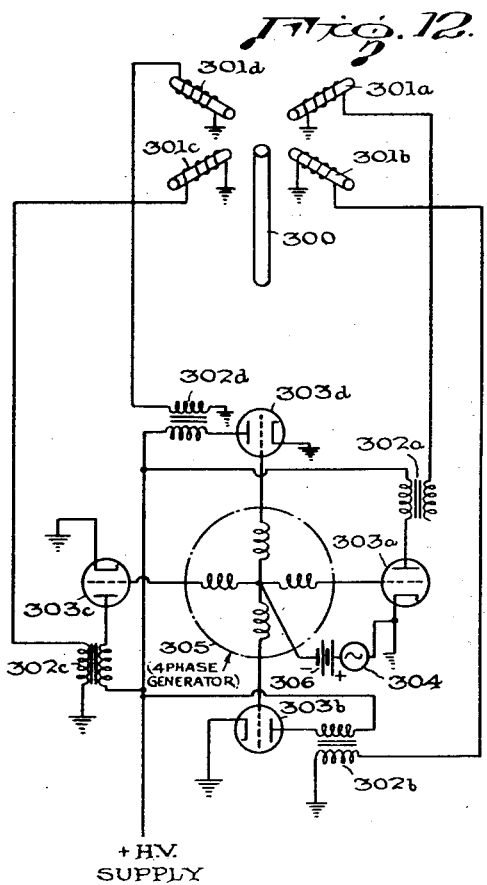

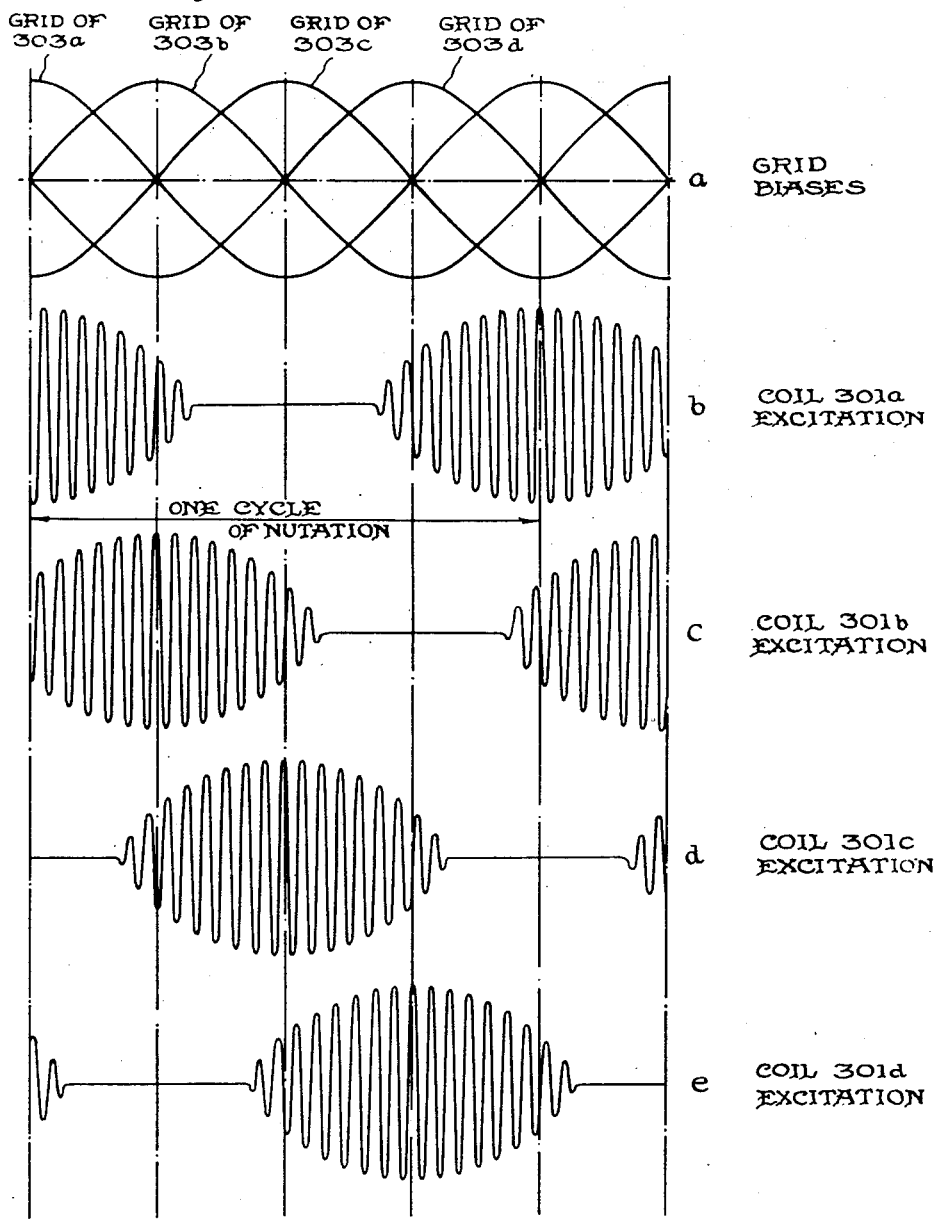

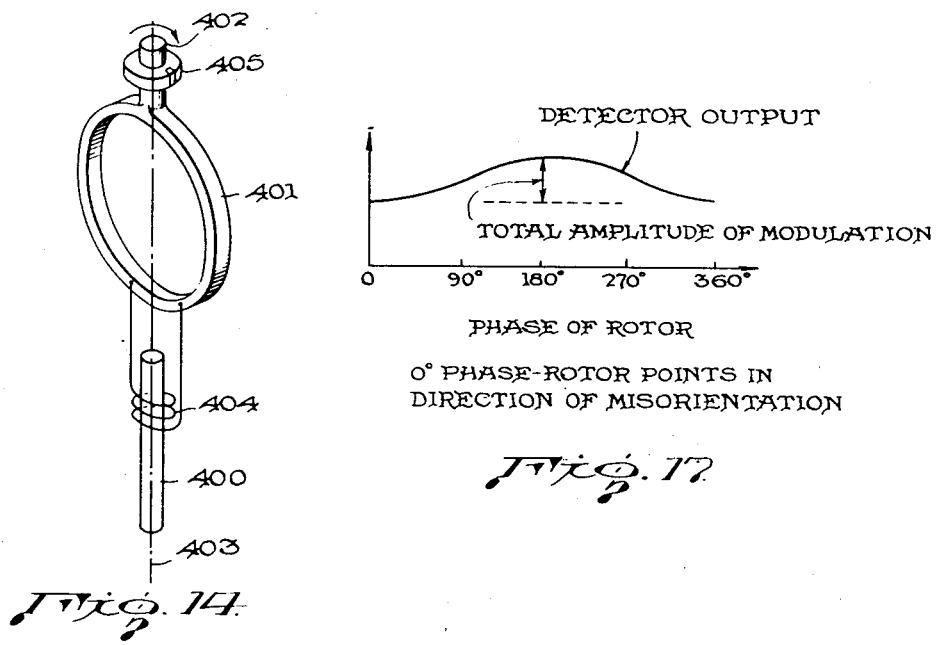
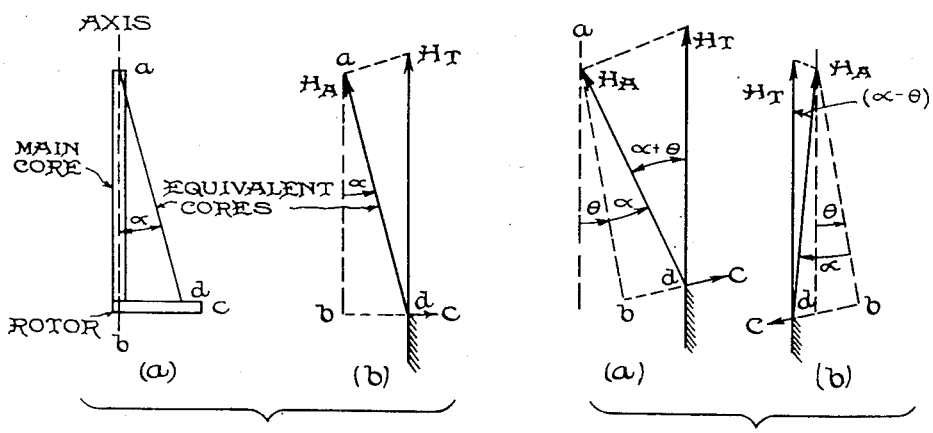

Patented Aug. 21, 1951

2,564,854

UNITED STATES PATENT OFFICE 2,564,854

APPARATUS FOR MEASURING INTENSITY OF MAGNETIC FIELD

Gary Muffly, Penn Township, Allegheny County, Pa., assignor to Gulf Research & Development Company, Pittsburgh, Pa., a corporation of Delaware Application June 23, 1947, Serial No. 756,426

4 Claims. (Cl. 177—380)

This invention concerns a magnetometer for measuring the total intensity of a magnetic field. In particular it concerns an improved form of self-orienting total intensity magnetometer suitable for use on a moving, tilting or gyrating vehicle for measuring the total intensity of a magnetic field.

Apparatus for measuring the intensity of a magnetic field for various purposes is well known. Many types of magnetometers suitable for special purposes are known in the prior art. The early magnetometers which were used particularly for measuring magnetic field intensity of the earth were required to be set up on a fixed support and it was necessary to orient their axes of sensitivity manually in the direction of the particular vector whose intensity was to be measured. In surveys of the earth's magnetic field the direction of the total vector was not known in advance and it was therefore customary to measure terrestrial components independently, from which the total vector could afterwards be computed.

In copending application Ser. No. 508,550, filed November 1, 1943 by Vacquier and Muffly, now Patent 2,555,209, issued May 29, 1951, there is disclosed an apparatus which may be used for making magnetic surveys from a moving vehicle. One embodiment shown in application Ser. No. 508,550 employs as a detecting element a magnetometer element of a type shown in Vacquier Patent No. 2,406,870 mounted in a universal support and having its direction of orientation in space stabilized by means of auxiliary magnetically sensitive elements so that a desired component of the magnetic field may be measured as the magnetometer is moved about.

Another embodiment which is shown in the above application Ser. No. 508,550 employs a Vacquier magnetometer element mounted in a universal support and has means for simultaneously oscillating the magnetometer element about two mutually perpendicular axes in such a way that the magnetometer element undergoes the magnetic field in various directions, these directions forming the elements of a cone whose axis is the average direction of the magnetometer element. The normal output signal of the magnetometer element is thereby modulated as a result of the directional displacements and the signal is analyzed into its quadrature components of modulation, which quadrature components are applied to two servo-motors respectively so that the latter tend to orient the average axis of the magnetometer element so as to reduce the modulation to a minimum. When the magnetometer element is thus oriented, its signal output is a measure of the total magnetic vector and the device is a self-orienting total vector magnetometer.

The present invention is an improvement on the above last mentioned apparatus of the application Ser. No. 508,550, simplifying the construction thereof and making its operation more reliable and more accurate.

The object of this invention is to provide an apparatus for measuring the total intensity of a magnetic field from a moving and tilting support.

Another object of this invention is to provide apparatus for sampling the magnetic field in various directions with a magnetically responsive element and of utilizing the resulting signals for orienting the element substantially in the direction of the magnetic vector.

Another object of this invention is to provide a magnetometer which measures the total intensity of a magnetic field to a high degree of precision.

Another object of this invention is to provide an improved form of magnetometer which measures the total intensity of a magnetic field even though mounted on a moving and tilting support.

A further object of this invention is to provide a magnetometer whose signal is modulated in a manner from which any deviation of the direction of orientation of the magnetometer element from the direction of the magnetic field may be corrected.

A further object of this invention is to provide apparatus whereby a magnetometer signal may be modulated in a manner so that the modulation signal is a measure of the deviation of the magnetometer axis from the direction of the magnetic field.

A further object of this invention is to provide apparatus for moving the magnetically sensitive element of a magnetometer in a nutating motion and whereby the resulting signal modulation may be used to orient the element so that its axis of sensitivity lies in the direction of the magnetic vector.

A further object of this invention is to provide apparatus whereby the signal from a magnetometer is modulated in accordance with the magnetic field intensity along directions adjacent that occupied by the magnetometer element and in which said modulation is used to orient the detector in the direction of maximum magnetic intensity.

A further object of this invention is to provide apparatus for modulating the signal from a directionally sensitive magnetometer in a manner which will depend on the directional orientation of the magnetometer in the magnetic field, said modulation being accomplished without moving the sensitive detecting element itself.

These and other objects are attained in a manner which will be apparent from the following specification of which the accompanying drawings form a part, and in the figures of which like numerals designate like parts.

Fig. 2 is a schematic electric wiring diagram of my improved magnetometer making use of the structure of Fig. 1;

Fig. 3 is a diagram showing the magnetic element and an associated revolving magnetic vane which may be used to alter the deviation of the effective axis of sensitivity of the magnetic element;

Fig. 4 shows a diagram of one form of apparatus for revolving the magnetic vane of Fig. 3 and also shows means for indicating the phase position of the magnetic vane in order to properly analyze the components of detector signal modulation which result;

Figs. 5 and 6 are diagrams showing how the magnetic vane displaces the effective axis of sensitivity of the magnetometer element;

Fig. 8 is a diagram of another form of the invention showing a number of magnetic vanes synchronously rotated to alter the direction of the effective axis of sensitivity of the magnetic element;

Figs. 9, 10 and 11 are diagrams illustrating how the magnetic vanes of Fig. 8 cooperate to displace the axis of sensitivity of the magnetic element;

Fig. 12 shows another embodiment of the invention in which displacement of the axis of sensitivity is accomplished without moving either the sensitive element or the deflecting vane;

Fig. 13 shows excitation curves for the deflecting vanes of Fig. 12;

Fig. 14 is a diagram illustrating another form of the invention in which the signal output of the magnetic element is modulated in proportion to the misalignment of its axis with the direction of the magnetic field;

Figs. 15 and 16 are diagrams illustrating certain quantitative relationships in the analysis of the preferred embodiment of my invention; and Fig. 17 is a curve showing the phase variation of detector output with vane position in the preferred embodiment.

Figure 1:
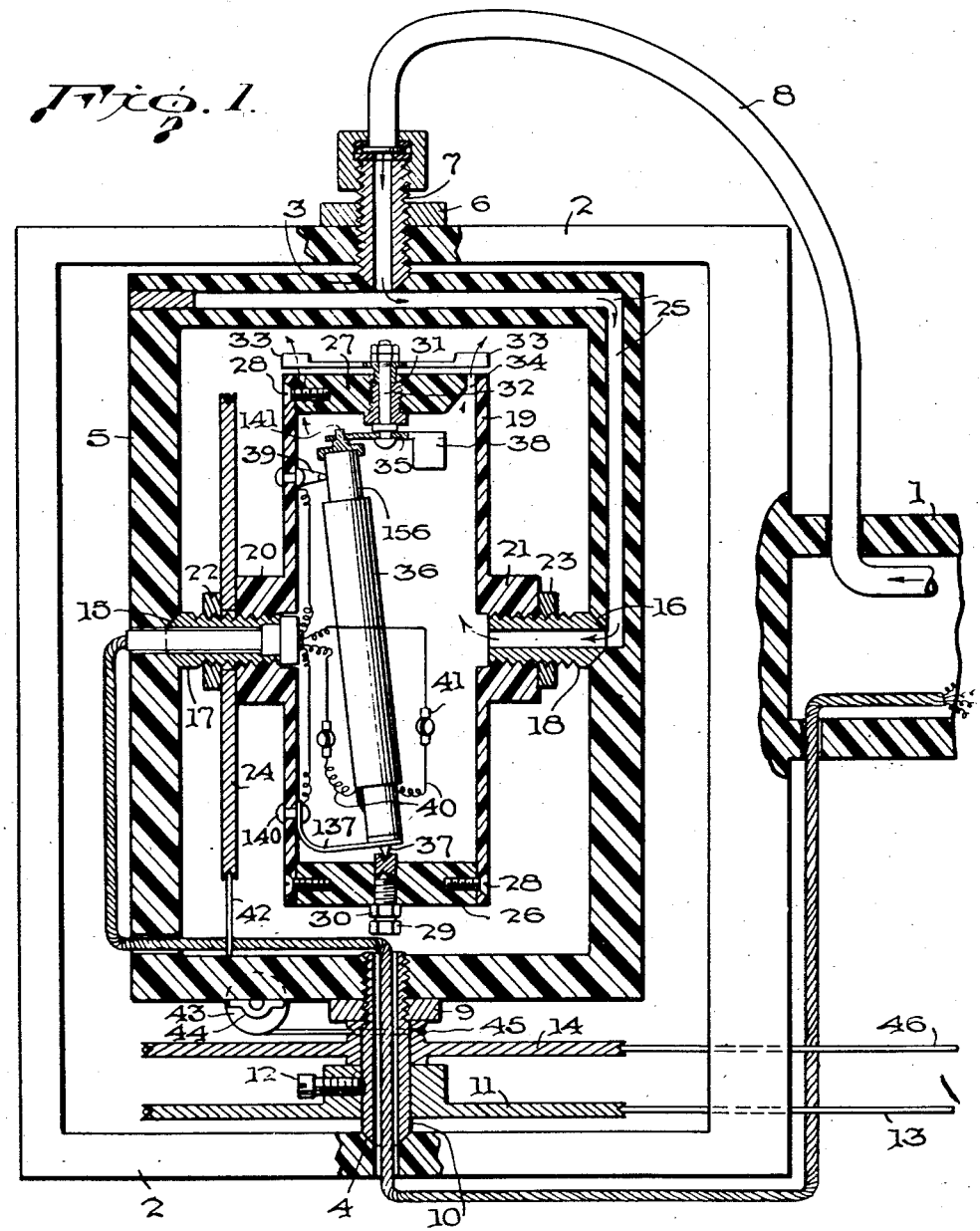
Fig. 1 is a diagrammatic sketch showing one embodiment of my invention wherein the magnetometer element is nutated about its average direction by means of a non-magnetic air turbine, and showing also the manner of mounting the detector for maintaining the orientation of its average axis in the direction of total vector.

Referring to Fig. 1, numeral 1 represents a support for the magnetometer element, said support being fastened or carried on a vehicle of any desired type, for instance an airplane. Attached to support 1 is an outer frame 2 which carries at 3 and 4 bearings for supporting an inner ring 5. Bearings 3 and 4 are shown simply as cone-shaped and may be adjusted by turning sleeve 7 and locking with nut 6. Alternatively, bearings 3 and 4 may be ball bearings or other well known anti-friction devices. The support 1 and frame 2 are conveniently made of an insulating material such as a phenolic condensation product, e. g., Bakelite, or other plastic and may be formed by fabrication or more preferably be made in one piece. The bearing sleeve 7 is drilled and connected by means of a swivel joint to tube 8 which passes through support 1 to a source of compressed air not shown. The purpose of this air supply will become evident later.

The inner support ring 5, also of plastic or other suitable insulating material, may rotate on bearings 3 and 4 and may be fixedly connected by means of lock nut 9 to its lower shaft 10 rotating on bearing 4. The shaft 10 also carries pulley 11 fastened to the shaft by set screw 12. A belt 13 engages the pulley 11 and is attached to a servo-motor, not shown, which may rotate the system 5 in accordance with signals as will be described later. The shaft 10 also carries pulley 14 but is not fastened thereto, so that pulley 14 may rotate independently of shaft 10. The purpose of pulley 14 will be described later. The inner frame 5 also carries bearings at points 15 and 16 which support by means of adjustable hollow trunnions 17 and 18 a tubular member 19 having bosses 20 and 21 into which the trunnions 17 and 18 are threaded. The tube 19 and bosses 20 and 21 attached thereto may be made of plastic or other insulating material. Adjustment of the trunnions 17 and 18 may be made by means of lock nuts 22 and 23. Lock nut 22 also clamps to its assembly the pulley 24. Frame 5 is drilled for air ducts 25 which carry the compressed air supplied from tube 8 through hollow trunnion 18 to the interior of the tube 19. Tube 19 has insulating end closures 26 and 27 shown held in place by means of screws 28. Lower closure 26 carries a cone-shaped bearing screw 29 threaded into 26 and locked in place by means of nut 30. The upper closure 27 carries a bushing 31 which is drilled for a shaft 32 and threadedly mounted in closure 27. Shaft 32 is more preferably carried in a ball bearing in the bushing 31 in conventional manner.

In order to deflect the sensitive magnetometer element 36, a small air turbine 33 may be used to drive the magnetometer in a nutating motion. Such an air turbine is simple, light, and may be made nonmagnetic. The modulation frequency of the magnetometer element signal will be the same as the rotation rate of the turbine. The frequency is not critical but the phase must be under surveillance so that orientation may therefrom be effected properly. This may be done by having the rotating system actuate an intermittent contact which has a definite phase with respect to its rotation.

Shaft 32 carries on its upper end air turbine blades 33 against which the compressed air inside tube 19 is directed by means of angularly drilled openings 34 in the end piece 27. Thus the compressed air supplied through sleeve 7, ducts 25, hollow bearing shaft 18 into tube 19, exhausts through the openings 34 and causes rotation of the turbine 33. The inner end of shaft 32 has rigidly fastened thereto a crossarm 35. One end of the crossarm carries on a small bearing 141 the upper end of a magnetically sensitive element 36 which may be of the type shown in Vacquier Patent No. 2,406,870. The lower end of the magnetic element 36 has a pivot 37 resting in the conical bearing of screw 29. Crossarm 35 has a counterweight 38 mounted on the opposite extension from that carrying bearing 141. Suitable bearings for shaft 32 and bearing 141 may be of hardened beryllium copper.

As shown in Fig. 1, one end of the sensitive element 36 is held on a fixed pivot 37 while the other is spun around by the crossarm 35. By way of example, the distance between pivot 37 and crossarm 35 may be 3". The nutation angle, that is, the angle between the axis of tube 19 and the axis of element 36, may conveniently be about 5°. Rotation of the air turbine 33 communicates through shaft 32 a nutating motion to magnetically sensitive element 36, the motion being in a cone whose apex is at 37. Rotation of the element 36 is prevented by a thin flexible metal strip 137 one end of which is fastened to pivot 37 and the other end of which is held by means of a terminal 140 on the insulating tube 19. The strip 137 thus serves as a torque member and also serves to make electrical connection to the nutating sensitive element 36 in order to permit surveillance of the phase of its motion by means of a contactor 39. Contactor 39 serves to close an electrical contact each time the magnetometer element returns to a definite position in its revolution and this contact may be used for synchronizing means to be described later. The sensitive element 36 carries primary and secondary coils whose connections are brought out through flexible leads 40 to terminals 41 mounted on tube 19, from which wires may be brought out through the shaft 17 and shaft 10 and returned to other apparatus to be described. The magnetometer coils may be wound on a longitudinally split metal sleeve 156 in order to provide rigidity and also to provide an electrostatic shield between the secondary and primary coils. The metal sleeve 156 also serves as a conductor means leading to contact 39.

In order to control the orientation of tube 19, which carries detector 36, the pulley 24, which is rigidly fastened to tube 19, is connected by means of an endless belt 42 passing over a pair of idler pulleys 43 mounted by means of bearing 44 on frame 5, the endless belt continuing around a small pulley 45 carried on the hub of pulley 14 which rides freely on shaft 10. Pulley 14 is engaged by belt 46 which goes to a servo-motor not shown in this figure but which will be described later. Thus, by means of belt 13, frame 5 may be oriented in any desired position about axis of bearings 7—10, and by means of belt 46 the tube 19 may be oriented in any desired position about the axis of trunnions 17—18. In normal operation, the device would be oriented with the axis of tube 19 in the direction of the total magnetic field and in order to do this most effectively the frame 2 would be mounted in a plane roughly perpendicular to the magnetic field, and tube 19 would be rotated about trunnions 17—18 into alignment with the field. In the figure, the tube 19 has been rotated through 90° on the trunnions 17—18 in order to more clearly illustrate the construction of the device. Frame 2 may be kept horizontal where the magnetic field is vertical, as in northern latitudes, or may be kept vertical when used in equatorial zones where the field is nearer horizontal, or it may be adjusted from time to time to suit conditions. Action will generally be satisfactory if frame 2 is kept within 45 degrees of perpendicularity with the earth's field by adjustment about support 1.

Fig. 2 shows a schematic wiring diagram of the electrical system attached to the device of Fig. 1. In Fig. 2 the tube 19 is shown diagrammatically as having its orientation controlled by two servo-motors 47 and 48 through the agency of belts 13 and 46 of Fig. 1.

The orienting servo-motors 47 and 48 are conveniently of the two-phase A.-C. type. One phase of each motor is energized continuously by A.-C. which is generated in synchronism with the closing of contact 39, amplified up to a suitable power level of a few watts and adjusted to the proper phase. This power is supplied to the two motors 47 and 48 in phases differing by 90° as will be explained later; that is the power in circuit 57 supplying one phase of motor 47 is 90° out of phase from the power in circuit 58 supplying one phase of motor 48. The other phase of each motor is energized in proportion to the magnetometer's output modulation and is supplied through circuit 65 as will be explained later. It also follows its phase. Now, if a modulation is present in the magnetometer output signal and the two windings of either motor are excited in exactly the same phase the motor will not run. This condition should obtain when the alignment error is at right angles to the gimbal action of the motor in question. It may always be made so by inserting the proper amount of phase shift in a suitable place in the circuit by conventional phase shifting means. Under the same conditions, the other motor will be arranged to receive voltages differing 90° in phase so that it will run in the correct sense with an output limited only by the amount of modulation. An error of quite a few degrees in the servo-motor supply phase adjustments has been found not to be serious, as then the magnetometer orientation is restored along a curved or spiral path which is not seriously longer than the ideal straight radial path. By way of example, a suitable orienting motor which may be used is the Kollsman 60 cycle, model 776-02. Its 60 cycle frequency represents a reasonable rotational speed for nutation, and this motor is capable of quickly stopping or reversing. An embodiment using these motors attained reversal in .12 second and required only about five watts per phase.

In Fig. 2 the tube 19 is shown as being supplied with compressed air from the pump 50 exhausting past the turbine vanes 33 causing rotation of the magnetometer element carried on its shaft 32, the lower pivot being indicated at 37. The sensitive element 36 is shown in accordance with Vacquier Patent No. 2,406,870 to comprise two high permeability cores excited by primary coils 51 and producing a signal in secondary coil 52. Primary coils 51 are connected to an exciting oscillator 53 which supplies excitation as described in said Vacquier patent. Primary coils 51 and secondary coil 52 have a common ground at connection 54. Contactor 39 closes a circuit each time the nutating sensitive element 36 makes one revolution. Through the connection 55 the contactor 39 controls the frequency of an oscillator in unit 56 which supplies power through leads 57 and 58 to the respective servo-motors 47 and 48.

The unit shown in Fig. 2 by block 56 comprises conventional circuits which perform the functions of an oscillator, amplifier and phase shifter and are not shown in detail since these are well known. The oscillator may comprise a gas tube relaxation oscillator or a multivibrator. Oscillators of this type may be made to lock in with the impulse applied from the contactor 39 by adjusting the oscillator to the approximate frequency of the contactor and applying the impulse from connection 55 to the grid circuit of a gas triode tube which forms an element of the oscillator. The locked-in oscillator may be followed by a tuned amplifier comprising one or more tuned stages of amplification which will eliminate undesired harmonics. The output of the oscillator-amplifier may be split into two phases approximately 90° apart by any of the known types of phase shifting networks. One simple and well known way of accomplishing such a phase shift is to use a capacity of suitable value in series with the winding of one motor and a direct connection to the winding of the other motor. If it is desired to shift the phase of both motors simultaneously, this may be done by altering the tuning of the amplifier by adjusting the capacity or inductance in one or more of its tuned stages.

Servo-motors 47 and 48 are of a two-phase type as previously mentioned and the power supplied through circuit 57 is approximately 90° out of phase with that supplied through circuit 58. Only one phase of each motor is supplied from oscillator 56, the other phase being supplied from the modulated output of secondary coil 52 as will be described later.

The signal from the secondary 52 of the sensitive element passes through condenser 59 to amplifier and demodulator 60. The demodulator in unit 60 is of conventional design and produces an output having a D.-C. component in proportion to the strength of the high frequency output of secondary 52 in the same manner as a detector in a radio receiver produces a D.-C. component usually employed for AVC, and an A.-C. component which is proportional to the amplitude of modulation, also in a manner similar to that of a radio receiver detector. The D.-C. component of the demodulated signal output is transferred through low pass filter 61 to recorder 62 which will be described later. Low pass filter 61 is for the purpose of rejecting the modulation signal and keeping it out of the recorder. Circuit 61 is conventional and may comprise two resistors and condenser as indicated. The A.-C. modulation signal output from the amplifier-demodulator 60 passes through the condenser 63 to the modulation amplifier 64 whose output is fed by connection 65 to both servo-motors 47 and 48 as previously explained.

In the operation of the apparatus, if the average axis 32—37 of the sensitive element 36 is in the direction of the magnetic vector, its output signal will have no modulation since the angle of the element 36 with the magnetic vector is always the same at each point of its nutation. Therefore, the output signal from secondary 52 will be a steady unmodulated A.-C. whose value after amplification and demodulation (rectification) will be recorded by recorder 62. Since there will be no signal in lead 65, the servo-motors will not be actuated. Any misplacement of the average axis 32—37 of the magnetometer element with the direction of total vector will cause a variation in the field undergone by element 36 in its nutation, resulting in modulation of the output from the secondary 52 which in turn gives rise to a signal in lead 65. The phase of this signal in lead 65 will determine which of the motors 47 and 48 will be caused to rotate and thus bring the magnetometer back to the normal unmodulated position.

The amplified signal representing the average output of the detector element 36 passes into recorder 62 which may be of the self-balancing potentiometric type. In order to increase the precision of the reading on recorder 62 the greater part of the field being measured is balanced out by a D.-C. current supplied through wire 66 to the secondary coil 52 of the magnetometer element. The D.-C. buck-out circuit does not affect the A.-C. operation of the magnetometer and the A.-C. signal from the magnetometer is effectively kept out of the buck-out circuit by the high resistances 142 and 143 or by the inclusion in lead 66 of the choke 67. The D.-C. buck-out circuit is supplied by battery 68 and is controlled by means of constant impedance attenuators 69 and 70 supplied from battery 68 and running from junction 80 to ground at 81. The sliding contacts of these two attenuators 69 and 70 are connected at junction 82, and are thence connected to choke 67 and wire 66, thus feeding the secondary coil 52 of the magnetometer element and returning to ground at 54. Attenuators 69 and 70 are of the constant impedance type and are arranged so that one of them, for instance 69, has current steps corresponding to a field at 52 of 500 gamma and is controlled by an automatic stepping device operating a ratchet wheel 83 as will be described later. Attenuator 70, also of the constant impedance type, has steps of 3,000 gammas and may be manually adjusted. Resistors 142 and 143 may be inserted in series with the attenuators in order to minimize interaction between attenuators 69 and 70.

The current in the magnetometer buck-out attenuator circuits 69 and 70 may be periodically checked by momentarily closing switch 88, thereby balancing the drop across resistor 89 against the standard cell contained in the recorder in conventional manner, using the recorder itself to indicate any unbalance. The buck-out attenuator current may be adjusted by means of the variable resistor 90 in series with battery 88 if the circuit is found to have drifted off from the correct value of current for proper calibration.

When the earth's field is thus very nearly entirely balanced out, recorder 62 will indicate variations in the remaining field experienced by element 36 and the precision obtainable on recording meter 62 may thereby be made very high. By this same token, however, the scale of meter 62 has only a short recording range and the indicator 84 may go off scale if the magnetometer is carried far northward or southward or passes over exceptionally large magnetic anomalies. In order to take care of a change in range automatically, the steps of attenuator 69 are made slightly smaller than the range of recorder 62 and when the indication of recording meter 62 reaches one end of the recorder scale a contact is closed to actuate a step switch progressing attenuator 69. For this purpose the contactor of attenuator 69 is mechanically connected to a ratchet wheel 83, having the same number of teeth as the number of steps on the attenuator. The ratchet is progressed one step by a single operation of solenoid 88 through the agency of a pawl 144. Connected through energizing battery 87 are two contacts, 85 and 86, at the extreme range limits of the indicator 84 of meter 62. Contacts 85 and 86 are closed respectively whenever the limit of scale travel is reached by indicator 84. Ratchet pawl 144 is returned by means of spring 145, and through the cooperation of contacts 146 with the solenoid armature contactor 147, the solenoid may operate repeatedly to cause progression of ratchet 83 over a number of notches whenever contacts 85 or 86 remain closed.

The operation of the automatic step switch is as follows: As indicator 84 approaches its upper limit stop and closes contact 86, solenoid 88 will operate ratchet wheel 83 in the direction to increase the current applied to the magnetometric element through wire 66. Ordinarily the next notch will return the pointer to scale. However, should pointer 84 reach the lower limit of its travel, thus closing contact 85, the solenoid 88 will repeatedly actuate pawl 144 to progress ratchet 83 until the contactor of attenuator 69 has made a complete revolution less one notch, at which point an on-scale balance again occurs on the recorder and indicator 84 opens the contactor 85, thus stopping further rotation of attenuator 69. A reversible rotary selector switch which will progress in either direction when properly connected to contacts 85 and 86 may alternatively be used instead of the type shown.

Recorder 62 may, for example, be an electronic self-balancing type of recorder, though other types, such as photoelectric potentiometric recorders may be use. One such recorder has been found capable of being calibrated to 1/600 of its scale length and may conveniently cover a range 600 gammas wide with an accuracy of 1 gamma. Attenuator 69 may then conveniently have 10 automatic steps of 500 gammas each, thus allowing an overlap of 100 gammas. Since the D.-C. buck-out current is carefully calibrated, the size of a jump as recorded on the automatic recorder 62 gives a record of sensitivity calibration of the entire magnetometric system. A record speed of 1″ to 2″ per minute may conveniently be used in aeromagnetic survey in the earth's field, although of course other speeds may be used for other purposes.

While the above embodiment of my invention is an improvement over that described in Vacquier and Muffly, application Serial No. 508,550, there are certain disadvantages in nutating the entire magnetometer element 36. These arise principally from the flexible leads 40 and 137, as well as mechanical difficulties. A preferred embodiment of my invention makes use of the other elements shown in Figs. 1 and 2 but avoids the necessity of mechanically disturbing the magnetometric element 36. This embodiment is described with reference to Figs. 3 to 7. In this embodiment nutation is effected without mechanically moving the sensitive element itself. The nutating effect is accomplished by revolving a vane of magnetic material about the magnetometer axis near one end of the sensitive element. The magnetic vane alters the effective magnetic axis of the element, and by revolving the vane the momentary magnetic axis of the element is thereby nutated.

Referring to Fig. 5, let the element indicated by numeral 100 represent the magnetometer element, similar to 36 of Figs. 1 and 2. Its axis of sensitivity would normally coincide with its geometric axis. One may, however, displace its effective axis of sensitivity by placing close to one end of the magnetometer element 100 a small eccentric vane of highly permeable magnetic material such as 101. The vane 101 may be made of the same material as the core of element 36, for example Permalloy. The asymmetry set up thereby causes the axis of sensitivity to make a slight angle such as 102 with the geometric axis of the element 100. By moving the vane 101 to the other side of element 100 as shown in Fig. 6, the axis of sensitivity is displaced to the other side of element 100, as shown. Thus, by revolving the vane 101 about a mechanical axis which coincides with the geometric axis of sensitive element 100 one may nutate the axis of sensitivity of the device without the necessity of mechanically nutating the sensitive element 100 itself. This is illustrated schematically in Fig. 3 in which the vane 101 is shown mounted on a shaft 103 which revolves the vane about the axis of the sensitive element 100.

Fig. 4 shows a convenient means for carrying out the nutating method of Fig. 3. Fig. 4 shows an improved form of the apparatus inside tube 19 of Fig. 1 with which it may be compared. In Fig. 4 the frame 105 corresponds to the tubular member 19 of Fig. 1, this being supplied with compressed air through its bearing shaft 106, the compressed air being delivered through a nozzle 107 to a turbine wheel 108 carrying the vane 101. The turbine wheel 108 may be made of plastic and may have the magnetic vane 101 embedded therein with a non-magnetic counterweight embedded diametrically opposite. The turbine wheel 108 revolves on shaft 109 in sleeve or ball bearings carried by the frame 105. On the upper part of the shaft 109 is a small commutator 110 with contact element 111 which is electrically connected to shaft 109 and through the bearing to lead wire 112. A small contact brush 113 held on a mounting on frame 105, not shown, makes contact with the contactor 111 upon each revolution of the turbine wheel and vane 101. Thus, the closing of contact between lead wires 112 and 113 gives an indication of the phase position of the vane 101 in its revolution about the axis of the magnetometer element 100. The magnetometer element 100 may now be fixedly mounted on the frame 105 and its leads brought out the lower end and carried through the trunnion 156 opposite to that which carries the compressed air. It is thus seen that Fig. 4 will replace the tube 19 and its contents of Fig. 1, making a simpler mechanical embodiment and at the same time avoiding flexible connections to the magnetometer element 100. The rest of the mounting and orienting mechanism shown in Fig. 1 may be applied to Fig. 4 in the manner previously described.

Quantitatively, the effect of the rotating vane may be analyzed by considering the composite element and rotor as comprising a single core in the form of an L as in Fig. 15—a. When placed in the ambient earth's field, such an L-shaped core behaves as if it were a single straight core $a$—$d$ at an angle $a$ with the main core axis $a$—$b$, where $a$ is the angle 102 of Fig. 5. The effective length and angle of this equivalent straight core will depend on the length of the rotor vane $b$—$c$, the length of the air gap between the rotor and main core, and the general leakage field of the configuration. In the following discussion, we will replace the actual core and rotor combination by this equivalent straight core.

In Fig. 15—$b$, the axis of the element is shown parallel to the earth's total vector $H_T$ whereby the equivalent core makes an angle $a$ with this vector. A component $H_{Ao} = H_T \cos a$ of the earth's vector acts along the equivalent axis. Now as the rotor of Fig. 15—$a$ rotates about the $a$—$b$ axis, it is as if the equivalent core axis $a$—$d$, Fig. 15—$b$, rotated about the axis $a$—$b$ with the angle $a$ remaining fixed. Evidently then, with the axis of the element oriented parallel to the earth's vector, the induced moment $H_{Ao}$ will remain constant for all angular positions of the rotor, and there will be no variation of the flux induced in the main core. In the case of Fig. 15—b, with no misorientation, the magnetizing component is always $$H_{A0} = H_T \cos \alpha \qquad \text{Eq. (1)}$$

In Fig. 16—a, the axis of the element has been tilted out of the earth's vector by a small angle $\theta$ so that the equivalent axis makes an angle $(\alpha+\theta)$ with the earth's vector $H_T$.

In Fig. 16—b, the axis of the element remains misoriented in the same direction and by the same angle $\theta$, but the rotor has been turned through 180 degrees so that the equivalent axis of the system is now $(\alpha-\theta)$ from the vector $H_T$.

In case 16—a, the magnetizing component is:

$$H_{A+} = H_T \cos (\alpha+\theta) = H_T (\cos \alpha \cos \theta - \sin \alpha \sin \theta)$$
$$\text{Eq. (2)}$$

In case 16—b, the magnetizing component is:

$$H_{A-} = H_T \cos (\alpha-\theta) = H_T (\cos \alpha \cos \theta + \sin \alpha \sin \theta)$$
$$\text{Eq. (3)}$$

Where $H_{A+}$ signifies that the rotor position is in the direction of misorientation of the element and $H_{A-}$ signifies that the rotor is pointed in a direction opposite to the misorientation.

By combining Equations 2 and 3 the expression for the average value of the induced moment over a complete revolution of the rotor is found to be:

$$H_{Aav.} = \frac{H_{A+} + H_{A-}}{2} = H_T \cos \alpha \cos \theta \qquad \text{Eq. (4)}$$

Moreover, the maximum variation in the induced moment due to rotation of the rotor is the difference between $H_{A+}$ and $H_{A-}$ or $$\Delta H_A = H_T\, 2 \sin \alpha \sin \theta \qquad \text{Eq. (5)}$$

and $\Delta H_A$ represents the total amplitude of the alternating magnetizing component superposed on the steady value $H_{Aav.}$ of Equation 4.

Now it is of interest to note again, that from Equation 4, the $H_{Aav.}$, which represents the steady component of the earth's field appearing at the magnetometer element, varies only as the cosine of the angle of misorientation $\theta$, and, hence, for small misorientations, the error in total field measurement will be small—of the order of 9 gammas for 1-degree misalignment in a 55,000-gamma total field.

On the other hand, the alternating field component imposed on the element varies as the sine of the misorientation angle—of the order of 960 gammas for 1-degree misalignment. Since the misorientation signal which drives the orienting motors is derived from this component, the servo system is therefore quite sensitive to small misalignments of the element.

As shown above, the magnetometer element 100 is subjected to a periodically varying magnetization, and the output signal will vary accordingly. Moreover, the magnitude of the superposed variation will be proportional to the sine of misorientation between the axis of the element 100 and the earth's total vector. In other words, the envelope of the output pulses of the element will show a modulation whose amplitude is proportional to the misorientation (for small angles) and at a frequency equal to the rotational frequency of the vane. Thus, with the magnetometer misoriented, the detector output will comprise a steady signal of considerable magnitude with a superposed component of modulation at the rotational frequency. As already shown by Equation 4, the average signal value will be decreased by the cosine of the misorientation angle. When the misorientation is corrected, the modulation component disappears, and the steady signal derived from the detector will be a measure of the total field intensity, of more exactly the total field times the cosine of the equivalent angle of tilt $\alpha$ of the core as shown by Equation 1.

It is also possible to show that the time phase of the modulation wave with respect to the rotor phase is a function of the direction of misorientation. Referring again to Fig. 16—a, it will be noted that when the rotor is pointed in the direction of misorientation (which is here chosen as the direction of tilt of the bottom of the element), the magnitude of the modulation component vector as given by Equation 2 is:

$$H_{A+} = H_T (-\sin \alpha \sin \theta) \qquad \text{Eq. (6)}$$

Whereas, with the rotor turned 180 degrees from this direction of misorientation, the modulation component as given by Equation 3 is:

$$H_{A-} = H_T (\sin \alpha \sin \theta) \qquad (\text{Eq. (7)})$$

It is thus seen that when the rotor is pointed in the direction of misorientation, the magnetization of the element 100 is a minimum, while at the 180-degree opposite position of the rotor, the magnetization of the element is a maximum. It follows then that the time phase of the modulation component of the detector output is indicative of the direction of misorientation but is 180 degrees out of phase with the angular phase of the rotor. This relation is shown graphically in Fig. 17. The 0-degree phase of the rotor is assumed to be where the rotor points in the direction of misorientation. Fig. 17 shows the detector output versus rotor phase relation.

The foregoing brief analysis shows that when misorientation occurs, the output level or envelope of the signal in the detector circuit is modulated at a frequency equal to the rotational frequency of the rotor. At the same time, the average output level is decreased—that is, a total field measurement error is introduced which is proportional to the cosine of the angle of misorientation. With decreasing angle of misorientation, the amplitude of modulation decreases and becomes zero when the axis of the element is parallel to the earth's magnetic vector, while the field measurement error also vanishes. Moreover, the phase of the modulation signal is established by the direction in which misorientation occurs.

Figure 7:
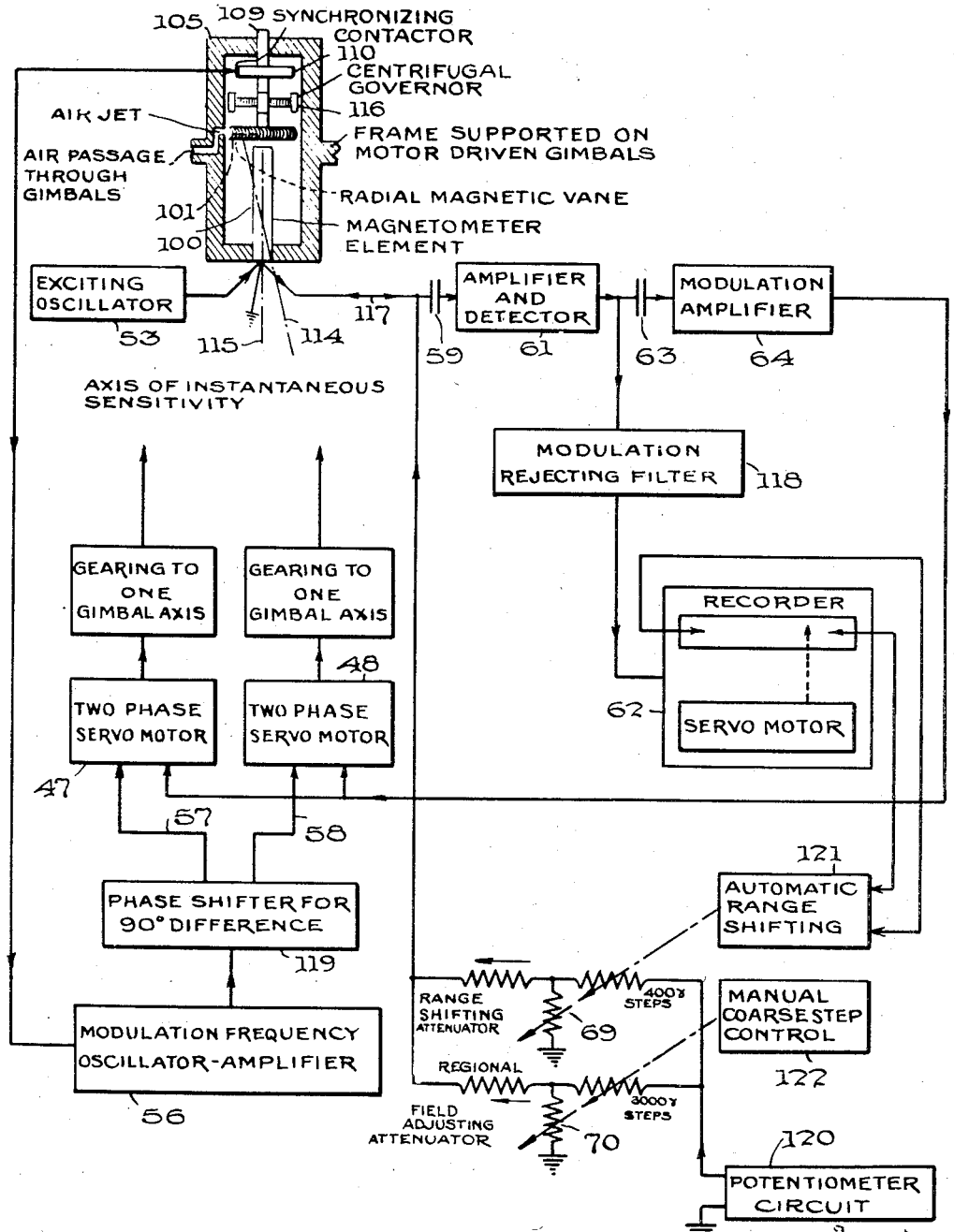
Fig. 7 is a diagrammatic representation of the electrical system of the preferred form of my magnetometer.

Fig. 7 is a wiring diagram of the preferred embodiment making use of the rotating vane shown in Figs. 3 to 6. Details of power supply, voltage regulation, nutation frequency indication and the like are omitted for the sake of clarity. The frame 105 shows the magnetometer element 100 fixedly mounted therein and having its primary excited by the oscillator 53. Instead of moving the entire magnetometer element as in Figs. 1 and 2, the compressed air supplied through the gimbal bearings to the air turbine merely rotates the magnetic vane 101 which has the effect of displacing the instantaneous axis of sensitivity 114 from the geometric or average axis 115. Contactor 110 carried on the shaft 109 permits ascertaining the phase position of the revolving vane. A centrifugal governor 116 is also mounted on the shaft 109 in order to maintain the speed approximately at some desired value which is however not critical. The three leads brought out from the bottom of element 100 in Fig. 7 will of course in actual practice be taken through the gimbal bearings which have been omitted from this figure for simplicity. Three such connections are necessary, mainly one to the primary of element 100 from exciting oscillator 53, a ground connection, and a connection from the secondary of element 100. The synchronizing connection may be brought out similarly. The signal generated in the secondary of element 100 and indicated as carried by wire 117 is passed through condenser 59 into the measuring circuit as described in connection with Fig. 2. The modulation rejecting filter 118 between the signal amplifier and the recorder is similar to the low pass filter 61 of Fig. 1.

In Fig. 7 the servo-motors are of the two-phase type similar to those described in connection with Fig. 2, oscillator 56 being controlled by the contactor 110 and generating power in synchronism with the revolution of the vane 101. Output from the oscillator 56 is fed into a phase-shifting network 119 which provides two outputs 57 and 58 which are 90° out of phase and which serve respectively to energize one phase of the two-phase servo-motors 47 and 48. The servo-motors 47 and 48 are geared or belted by means of connections 46 and 13 of Fig. 1 to cause rotation about their respective gimbal axes. The other phase of the servo-motors is supplied by the modulation amplifier 64 obtained from the detector output through condenser 63. The phase relation of the modulation of the detector signal and the energy supplied by oscillator 56 determines which servo-motor will be actuated and in which direction it will go as explained in connection with Fig. 2.

The signal representing the average output of the detector after passing through filter 118 is recorded on recorder 62 as described in connection with Fig. 2. Attenuators 69 and 70 have the same function as the same number elements in Fig. 2, the D.-C. buck-out being supplied from a potentiometer circuit 120. The automatic range shifting mechanism of Fig. 2 is indicated generally by 121 and a manual control by 122.

While I have described a preferred way in which a magnetometer may be effectively nutated without the necessity of having the sensitive element itself partake of the nutating motions, there are other ways in which this may be done. Thus, for example, instead of using a single rotating vane as described to deflect the ambient field, one may use four vanes as shown in Figs. 8–11. Referring to Fig. 8, the element 200 is subject to the influence of four vanes 201—a, 201—b, 201—c and 201—d. Vanes 201—a and 201—c are fastened 180° apart on shaft 203; vanes 201—b and 201—d are fastened 180° apart on shaft 204. The two shafts are rotated as indicated through a mechanism (not shown) and are kept in fixed phase relationship as by means of gears 206. Because the position of vane 201—c in Fig. 8 creates the greatest axis-shifting effect on the magnetometer, the resultant axis of sensitivity will be displaced approximately as shown by line 202 in Fig. 8. The Figs. 9, 10 and 11 taken in turn indicate the progressive vane positions by means of arrows marked a, b, c, d, respectively, for each additional 90° of shaft rotation. The axis of sensitivity 202 progresses around an orbit as the configuration of the vanes progresses, thus producing the effect of nutating the axis of sensitivity similar to that obtained by rotating the single vane 101 of Fig. 3. By means of a conducting segment on commutator 207 which rotates with shaft 203 and a brush (not shown) bearing against the commutator, one may obtain a phasing signal for use in analyzing the modulated signal from element 200 as previously described.

Still another way in which the axis of sensitivity may be made to nutate about the geometrical axis of the element is illustrated in Fig. 12. In the embodiment of Fig. 12 no moving vanes are employed, and instead of a rotating vane a number of fixed vanes 301—a, b, c and d are used. Four are shown in Fig. 12 at 90° spacing, although three vanes 120° apart or $n$ vanes $360°/n$ apart may be used if $n$ is greater than two. The vanes 301—a, 301—b, 301—c and 301—d are mounted near the end of magnetometer element 300 and symmetrically placed with respect to the geometrical axis of element 300. Each vane is wound with wire and may be excited through a transformer with A.-C. of a high frequency, preferably of frequency far above the normal excitation frequency of element 300. For example, if the element 300 is driven at 1,000 cycles/sec., then the vanes 301—a, 301—b, 301—c and 301—d may, for example, be excited at 30,000 cycles/sec. This high-frequency excitation should be strong enough to saturate the vane with A.-C. flux and thereby reduce its effective permeability to the direct flux of the earth's field.

Each vane 301—a, 301—b, 301—c and 301—d is in effect a magnetic deflector which allows some of the earth's flux from its own side of the core of detector element 300 to be detoured from its normal path. It takes some of the flux that would otherwise pass to one side of the core of element 300 and leads it over to the core. If the vanes were all identical and symmetrical, their total effect would be to increase the total flux through core of 300 without disturbing the axis of sensitivity. If, however, any one vane conducts less than its share of flux, on the average, to the core of element 300, then the predominance of flux from the opposite side of the element causes the axis of sensitivity to be inclined in the direction opposite to the vane. The detector 300 and its associated circuits are made to respond to the integrated magnetic effect over periods of time long compared to the period of the high frequency excitation of the vanes but short compared to the period of the nutation frequency. The high frequency excitation should be strong enough to saturate the vane with A.-C. flux so as to reduce its effective permeability during the time the high frequency excitation is on. When any one of the vanes is so saturated, the effective axis of sensitivity of the magnetometer is displaced in the opposite direction by the opposite vane or vanes, which are unsaturated. If each vane is saturated in turn, the axis of sensitivity can be nutated continuously. This is accomplished with the circuit shown in Fig. 12 as will be explained later. When the high frequency is not present, the value of flux in the vane depends on the ambient field and orientation and may assume any value between the saturation values in the positive and negative senses. When the high-frequency excitation is present, however, the A.-C. excitation may be made strong enough to saturate the vane over most of the cycle. Thus, the vane is saturated in one direction during one-half of the high frequency cycle and is saturated in the opposite direction during the other half of the high frequency cycle. Since the saturation fluxes are equal and opposite, their time average is zero over the whole cycle, and thus, in effect, none of the ambient flux gets through. Of course, there will be a brief period when the flux is shifting from plus-to-minus saturation during which time the ambient field can have some effect, but this can be made as small as desired by increasing the high-frequency excitation. In practice, it is only necessary to increase the high-frequency excitation to the point where the ambient flux is sufficiently restricted to effect a displacement of the axis of sensitivity of element 300.

In Fig. 12 each vane, such as 301—a, receives its saturating A.-C. from high frequency generator 304 by means of a commutating tube such as 303—a and transformer such as 302—a. The tubes are commutated or cut off and on by means of a low-frequency multiphase generator 305, having the same number of phases as there are vanes 301. In the illustration, 4 phases are provided. A D.-C. cut-off bias may be provided by battery 306, or alternatively tubes 302 may be used that cut off at approximately zero bias. Transformers 302 serve to keep D.-C. out of the vane windings, as well as low-frequency transients which might otherwise disturb operation of the device. In operation, the high-frequency generator 304 excites the vane 301 and the low-frequency generator 305 controls the sequence of excitation by controlling the grid bias on tubes 303. A phasing signal may be obtained from generator 305.

Fig. 13 shows at 13—a how the 4-phase alternator shifts the individual grid biases of tubes 303 so that the tubes 303—a, b, c and d are rendered conducting in sequence. The superimposed high frequency from source 304 is not shown in Fig. 13—a, but as each grid reaches its maximum upward swing, the high-frequency output of the tube reaches its peak as shown in curves 13—b to 13—e. Each tube 303 is active for about half of the nutation period, the exact length being adjusted by proper choice of battery 306 and tubes 303 to make the nutation follow a smooth, approximately circular orbit. Use of three, four or more phases with symmetrical vanes is preferred. The response of detector element 300 should be fast enough to follow the frequency of generator 305 but too sluggish to follow the high frequency of generator 304. The detector circuit following element 300 is normally inherently sluggish toward the highest frequencies. This effect can be increased by placing shielding of non-magnetic conductive material around vanes 301—a, b, c and d, or around element 300, or between the vanes and the element. Any such shielding should be only heavy enough to be effective against the high frequency, as it should have a minimum effect on the nutation frequency. If the above requirements are met, the magnetometer response integrates or averages the effect of vanes 301—a, b, c and d over several cycles of the high saturating frequency.

Instead of effecting a nutation of the axis of sensitivity of the magnetic element to produce an output signal whose modulation is a measure of the misorientation in the ambient field, another method of producing such modulation may be used. This consists in rotating an earth inductor coil about an axis which coincides with the geometric axis of the magnetic element and coupling its output to that of the latter. Fig. 14 illustrates an embodiment of the invention in which this is done.

The earth inductor coil 401 of Fig. 14 is carried by a bearing at 402 on an axis 403 which is common to that of the magnetometer element 400. When the direction of the field coincides with axis 403, no E. M. F. is generated in the coil 401, but any deviation will cause a voltage to be generated in proportion to the deviation and with a phase corresponding to the direction of the deviation. The output of coil 401 passes through coil 404, the latter being rigidly connected to coil 401 and connected electrically in series therewith. The coil 404 is located so that it is electromagnetically coupled to the magnetic element 400. The current in coil 404 will lag the voltage generated in 401 by a small amount, but this phase shift can be taken care of by means of a phase shifter elsewhere in the circuit. The rotation frequency of coil 401 should be less than the excitation frequency of the magnetic element 400, and may be of the same order as the nutation frequency used in previously described embodiments. The current in coil 404 sets up an axial field in detector 400 which alternatively adds to and subtracts from the normal output in a manner similar to that of the previously described nutation schemes. Coils 401 and 404 may have any desired number of turns. Coil 401 may even be a single turn, in which case coil 404 should also have only a few turns to get a maximum transfer to the detector element. A conducting segment in commutator 405 which rotates with coil 401 and a brush (not shown) bearing against the commutator permit of obtaining a phasing signal for analyzing the modulation signal from element 400 into components for controlling the orienting mechanisms as previously described in connection with Figs. 2 and 7.

Having thus described a preferred embodiment of my invention and also other desirable embodiments, it is understood that these are susceptible to variations apparent to those skilled in the art and within the scope of the appended claims.

The apparatus herein disclosed in Figure 14 is disclosed and claimed in copending application by Gary Muffly, Serial No. 224,303, filed May 3, 1951, and assigned to the same assignee as the present application.

The method and apparatus herein disclosed in Figures 12 and 13 is disclosed and claimed in copending application by Gary Muffly, Serial No. 224,304, filed May 3, 1951, and assigned to the same assignee as the present application.

What I claim as my invention is:

1. A self orienting magnetometer comprising a magnetic field responsive element producing an electrical signal in proportion to the intensity of the magnetic field along its principal axis of sensitivity, support means holding stationary thereon said element, magnetic field deviating means adjacent said element rotatably mounted on said support, means for rotating said field deviating means about an axis which substantially coincides with the principal axis of sensitivity of said element whereby the field affecting said element is modulated in synchronism with said rotation and the output of said element is modulated whenever its axis of sensitivity is not coincident with the total undeviated magnetic field, a universal mounting for said support means, orienting servo means connected respectively to the axes of said universal mounting, and means responsive to quadrature components of modulation in the output of said element controlling respectively said servo means.

2. A self orienting magnetometer comprising a magnetic field responsive element producing an electrical signal in proportion to the intensity of the magnetic field along its principal axis of sensitivity, support means holding stationary thereon said element, an asymmetrically placed member of high permeability rotatably mounted on said support and adapted for rotation about the principal axis of sensitivity of said element, means for rotating said asymmetric member whereby the field affecting said element is deviated in synchronism with said rotation and the output of said element is modulated whenever its axis of sensitivity is not coincident with the undeviated magnetic field, a universal mounting for said support means, orienting servo means connected respectively to the axes of said universal mounting, and means responsive to quadrature components of modulation in the output of said element controlling respectively said servo means.

3. A self orienting magnetometer comprising a magnetic field responsive element producing an electrical signal in proportion to the intensity of the magnetic field along its principal axis of sensitivity, a mounting holding said element stationary thereon, a non-magnetic motor on said mounting arranged to rotate an asymmetric magnetic vane about the principal axis of sensitivity of said element, means driven by said non-magnetic motor for producing an electrical signal in synchronism with and of known phase relation to the rotation of said magnetic vane, means for detecting modulation of the output signal produced by said detector, said modulation resulting whenever the principal axis of sensitivity of the element is not coincident with the ambient magnetic field, a universal gimbal support for said mounting, a pair of two-phase electric motors connected in driving relationship respectively to the gimbal axes of said universal support, means for amplifying the detected modulation to a level sufficient to excite one phase of each of said electric motors, means for exciting the other phase of each of said electric motors in synchronism with said electrical signal from said non-magnetic motor, and phase determining means connected to said last named electric motor exciting means adjusted to effect rotation of the respective electric motors in a sense which reduces the modulation of the output signal from said magnetic field responsive element.

4. A self-orienting magnetometer comprising a magnetic field responsive element producing an electrical signal in proportion to the intensity of the magnetic field along its principal axis of sensitivity, support means holding said element stationary thereon, means mounted on said support for rotatively deviating the magnetic field about the principal axis of sensitivity of said element whereby the field affecting said element is modulated in synchronism with said rotation and the output of said element is modulated whenever the principal axis of sensitivity is not coincident with the total undeviated magnetic field, a universal mounting for said support means, orienting servo means connected respectively to the axes of said universal mounting, and means responsive to quadrature components of modulation in the output of said element controlling respectively said servo means.

GARY MUFFLY.

REFERENCES CITED

The following references are of record in the file of this patent:

UNITED STATES PATENTS

| Number | Name | Date |
|---|---|---|
| 1,784,522 | Harrison | Dec. 9, 1930 |
| 1,880,831 | Cramblet | Oct. 4, 1932 |
| 2,053,154 | Pierre | Sept. 1, 1936 |
| 2,201,559 | Moseley | May 21, 1940 |
| 2,204,292 | Barth | June 11, 1940 |
| 2,330,661 | Arey | Sept. 28, 1943 |
| 2,389,146 | Fragola | Nov. 20, 1945 |
| 2,406,870 | Vacquier | Sept. 3, 1946 |
| 2,412,612 | Godet | Dec. 17, 1946 |
| 2,432,514 | Depp | Dec. 16, 1947 |